May 6, 1924.
E. C. NORTHRUP
COUPLING
Filed July 7, 1921
1,493,221
2 Sheets-Sheet 1
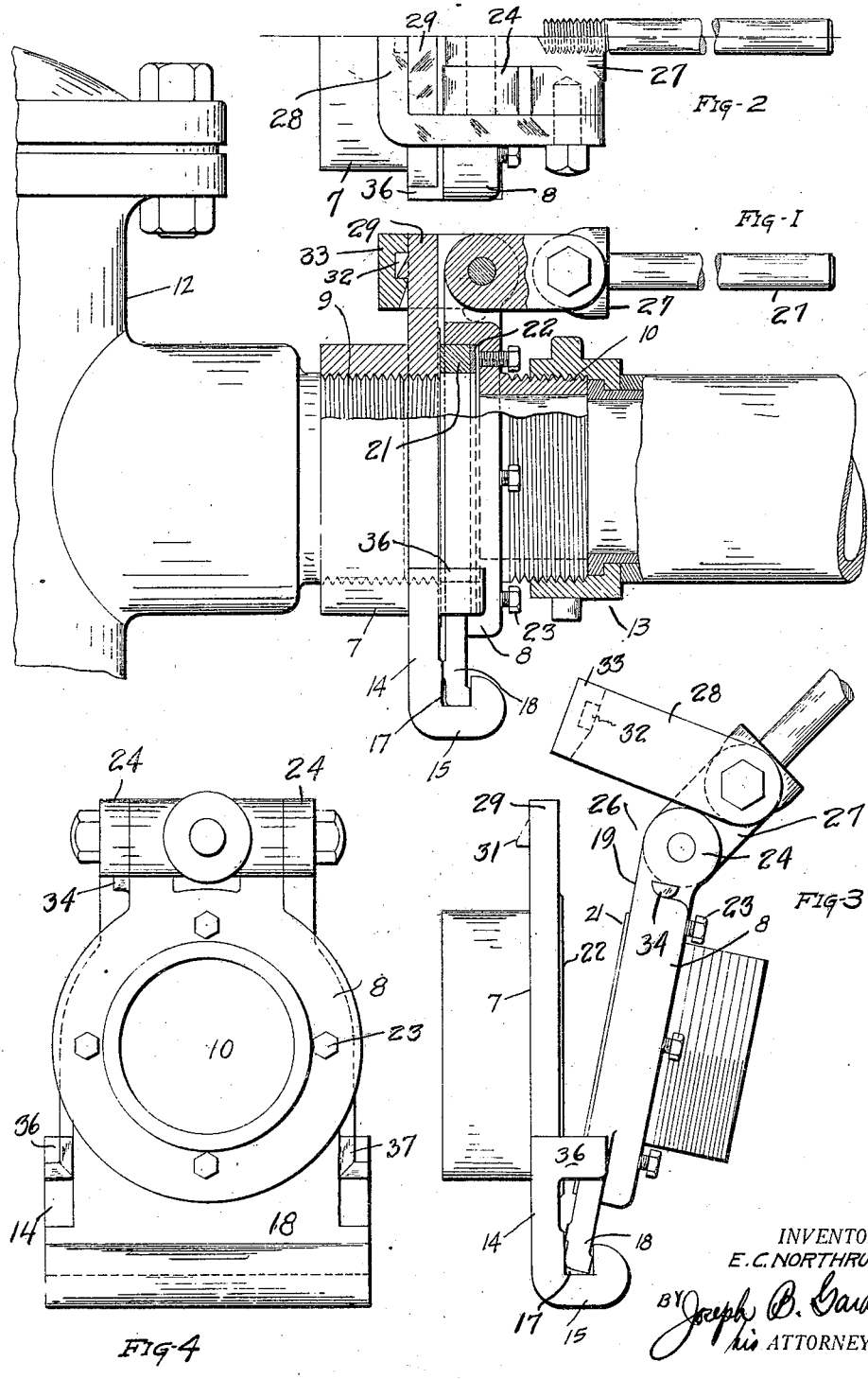
INVENTOR.
E. C. NORTHRUP
BY Joseph B. Gardner
his ATTORNEY May 6, 1924.

E. C. NORTHRUP

COUPLING

Filed July 7, 1921

INVENTOR.
E. C. NORTHRUP
BY Joseph B. Gardner
his ATTORNEY

Patented May 6, 1924.

1,493,221

UNITED STATES PATENT OFFICE.

ELMER C. NORTHRUP, OF SAN FRANCISCO, CALIFORNIA, ASSIGNOR OF ONE-HALF TO ARTHUR BROWNE, OF SAN FRANCISCO, CALIFORNIA.

COUPLING.

Application filed July 7, 1921. Serial No. 482,885.

*To all whom it may concern:*

Be it known that I, ELMER C. NORTHRUP, a citizen of the United States, and a resident of the city and county of San Francisco, State of California, have invented a certain new and useful Coupling, of which the following is a specification.

My invention relates to a coupling, and particularly to a coupling for conduits.

An object of the invention is to provide a coupling which will enable conduits to be instantly coupled or uncoupled.

Another object of the invention is to provide a coupling which in the coupled position will hold the conduits together with a maximum force, but which may be placed in coupled or uncoupled position by the operator at a minimum expenditure of force.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side elevation, partly in section, showing a hydrant and hose coupled by my device.

Figure 2 is a plan view of one-half of the coupling.

Figure 3 is a side elevation of the coupling showing the members thereof in inoperative connected relation.

Figure 4 is an end view of the coupling in operative position.

Figure 5:
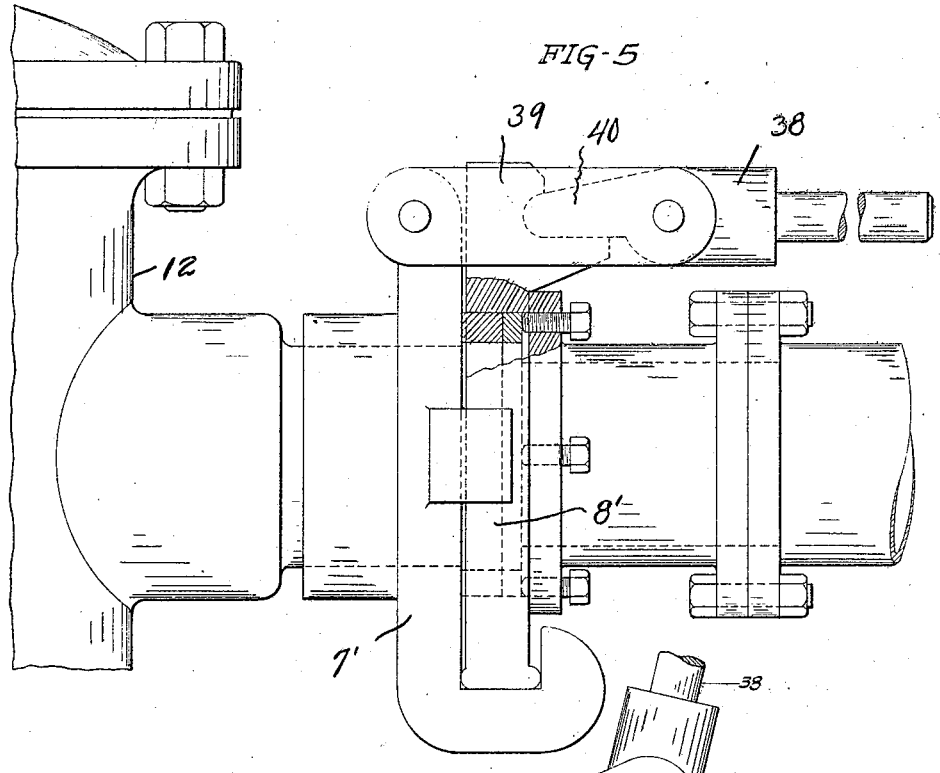
Figures 5 and 6 are side elevations of a modified form of the invention, showing the coupling in the operative and inoperative positions respectively.

In a great number of instances such as for example when firemen couple a hose to a water hydrant, it is necessary to not only effect an efficient coupling of said members but to do so with all haste possible. The coupling of my invention is particularly adapted for such use, however the device as well as the parts thereof may be used advantageously under other circumstances as will be understood from the specification.

Briefly expressed the coupling of my invention as here shown comprises a pair of cooperating members which are adapted to be secured to the conduits, a resilient element adapted to lie between the members in the coupled position of the device, means at one side of the members for releasably connecting them together so as to form what may be termed a hinged connection, means for guiding the members to an aligned position, means at the other side of the device for drawing the members together after they are connected by said first mentioned means, and means for adjusting the position of the resilient element.

A detailed description follows:

The device as here illustrated comprises a pair of cooperating members 7 and 8 which are adapted to be secured in any suitable manner to the ends of the conduits or the like which the coupling is to connect together. The members are provided with openings 9 and 10 which are arranged to be aligned with the passages of the associated conduit, and with each other when the coupling is in operative position. As here shown the member 7 is threaded internally so as to be readily attached to a water hydrant 12, whereas the member 8 is threaded externally to enable the usual hose connection 13 to be secured thereto.

Means are provided for detachably connecting the members together so as to provide what may be termed a pivotal connection therebetween. Extending laterally from the member 7 is an extension 14 having an angular projection 15 in which is formed a transversely extending recess 17. The member 8 is provided with a somewhat similar extension 18 which is adapted to removably seat in the recess 17. In this manner the member 8 and its associated conduit may be supported and enabled to swing to and from the member 7 about an axis disposed perpendicular to the longitudinal axis of the members. One of the members, preferably the member 8, is provided on its face 19 with a resilient gasket 21 which is forced against the opposing face 22 of the member 7 when the members are in the coupled position; a yielding engagement, with the consequent tight fit, is thus permitted between the opposing contacting surfaces of the members. In order that the gasket 21 may be adjusted longitudinally so as to vary the amount it projects outwardly from the member 8, I have provided a backing ring 22 preferably formed of metal, and engaged by the screws 23 extending through the member 8. By thus turning the screws 23 in the proper direction the desired adjustment of the gasket 21 may be had.

Means are provided for drawing the two members together after they have been connected for pivotal movement such as is here afforded by the engagement of the extension 18 in the recess 17. Preferably pivoted to the ears 24 at the side 26 of the member 8 is a lever 27, to which is pivoted intermediate the ends of the latter, an arm 28 which is arranged to hook over and releasably engage a lateral projection 29 formed on the adjacent side of the member 7. The projection 29 is preferably formed with an abutment 31 which is adapted to seat in a depression 32 in the end 33 of the arm when the latter is engaged with the projection 29, thereby preventing any slip. In operation, after the extension 18 is seated in the recess 17, the arm 28 is slipped over the projection 29, and the lever 27 pulled downwardly until the two members 7 and 8 are held in close association and the gasket 21 tightly interposed between them. A stop 34 is provided on the member 8 so that upon the downward movement of the lever, any tendency of the member 7 to raise will be prevented. Upon reversing the direction of movement of the lever, the arm may be quickly released and the extension 18 then removed from the recess, whereby the members and their associated conduits are uncoupled. It will be noted by referring particularly to Figure 1, that when the members are in the coupled position, the pivotal point of the lever and the member 8, as well as the pivotal point of the arm and lever, and the point of engagement of the arm and projection 29, are all three substantially disposed in a straight line. In this manner the members will be held in coupled position against practically any force applied longitudinally thereof. Furthermore on account of the proximity of the lever pivot and arm pivot, a tremendous leverage may be available for forcing the members together.

The member 7 is preferably provided with a pair of lugs 36 and 37 which serve to guide the members to a properly aligned position when drawn together.

Figure 6:
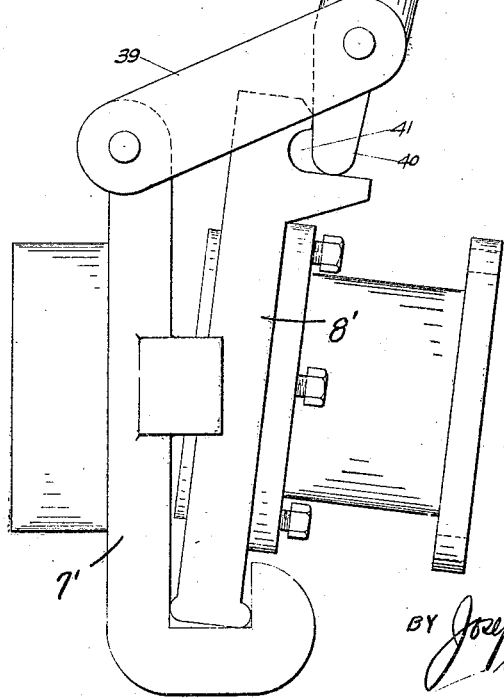

In Figures 5 and 6, I have shown a slightly modified means for drawing the members together. In this form of the invention the lever 38 is carried by the member 7' and is connected thereto by means of a link 39, the lower end 40 of the lever being adapted to engage in a seat 41 formed in the member 8'. Downward movement of the lever, in a manner similar to that shown in constructions illustrated in Figures 1 to 4, causes the members to be drawn together.

I claim:

1. In a coupling, a pair of perforated cooperating members, a resilient gasket carried on the face of one of said members and arranged to abut against the adjacent face of the other member, a lateral extension at one side of one member provided with a transversely extending recess, an extension formed on the same side of the other member adapted to seat in said recess whereby a pivotal connection is substantially provided between said members, and means for drawing said members together.

2. In a coupling, a pair of cooperating members having openings adapted to be aligned, a laterally disposed seat provided on one member, means on the other member adapted to engage in said seat whereby a pivotal connection may be substantially had between said members, means for drawing said members together, and guides on one member adapted to be engaged by the other whereby said members will be drawn together with the openings aligned.

3. In a coupling, a pair of cooperating members having openings adapted to be aligned, a resilient gasket carried on the face of one of said members and arranged to abut against the adjacent face of the other member, means for varying the position of said gasket longitudinally of the member supporting it, means for releasably connecting said members together to permit of the movement of one member toward the other, and means for drawing said members together.

4. In a coupling for conduits, a pair of cooperating members having openings adapted to be aligned, means on each member for attaching it to a conduit, a resilient gasket carried on the face of one of said members adapted to abut against the adjacent face of the other member, a lateral extension at one side of one member provided with a transversely extending recess, an extension formed on the same side of the other member adapted to seat in said recess whereby a pivotal connection may be substantially had between said members, a lever pivoted at one end to the free side of one of said members, and an arm pivoted to said lever intermediate the ends thereof adapted to releasably engage the other member whereby upon the rocking of the lever said members may be drawn together.

5. In a coupling for conduits, a pair of cooperating members having openings adapted to be aligned, means on each member for attaching it to a conduit, a resilient gasket carried on the face of one of said members adapted to abut against the adjacent face of the other member, a lateral extension at one side of one member provided with a transversely extending recess, an extension formed on the same side of the other member adapted to seat in said recess whereby a pivotal connection may be substantially had between said members, a lever pivoted at one end to the free side of one of said members, an arm pivoted to said lever intermediate the ends thereof adapted to releasably engage the other member whereby upon the rocking of the lever said members will be drawn together, the pivotal point of the arm and lever, and the point of engagement of the arm and other member are arranged to lie in a straight line when said members are drawn together, and guides on one member adapted to be engaged by the other whereby said members will be drawn together with the openings aligned.

In testimony whereof, I have hereunto set my hand at Oakland, California, this 30th day of June, 1921.

ELMER C. NORTHRUP.